(12) United States Patent
Nagamatsu

(10) Patent No.: US 8,472,720 B2
(45) Date of Patent: Jun. 25, 2013

(54) IMAGE PROCESSING METHOD, APPARATUS AND PROGRAM

(75) Inventor: Yasunari Nagamatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 544 days.

(21) Appl. No.: 12/836,003

(22) Filed: Jul. 14, 2010

(65) Prior Publication Data

US 2011/0019927 A1 Jan. 27, 2011

(30) Foreign Application Priority Data

Jul. 23, 2009 (JP) .................................. 2009-172566

(51) Int. Cl.
*G06K 9/36* (2006.01)
(52) U.S. Cl.
USPC .......................................... 382/180; 382/225
(58) Field of Classification Search
USPC ........................... 382/164, 165, 180, 224, 225
See application file for complete search history.

(56) References Cited

U.S. PATENT DOCUMENTS

| 6,701,010 | B1 | 3/2004 | Katsuyama | 382/165 |
|---|---|---|---|---|
| 7,623,712 | B2 | 11/2009 | Dai et al. | 382/180 |
| 2008/0123945 | A1* | 5/2008 | Andrew et al. | 382/164 |

FOREIGN PATENT DOCUMENTS

| JP | 11-288465 | A | 10/1999 |
|---|---|---|---|
| JP | 2006-344069 | A | 12/2006 |
| JP | 2007-158725 | A | 6/2007 |
| JP | 2008-206073 | A | 9/2008 |

* cited by examiner

*Primary Examiner* — Andrew W Johns
(74) *Attorney, Agent, or Firm* — Fitzpatrick, Cella, Harper & Scinto

(57) ABSTRACT

The performance of image processing is assured by executing region segmentation of an image at high speed. Pixels are classified into clusters conforming to a feature such as color. In a case where a suitable cluster for classifying a pixel is undefined, a new cluster is defined and the pixel is classified into this cluster. An upper-limit value on number of clusters is set prior to classification. If the number of clusters exceeds the upper-limit value, clusters already defined are merged. This limits an increase in the number of clusters.

8 Claims, 13 Drawing Sheets

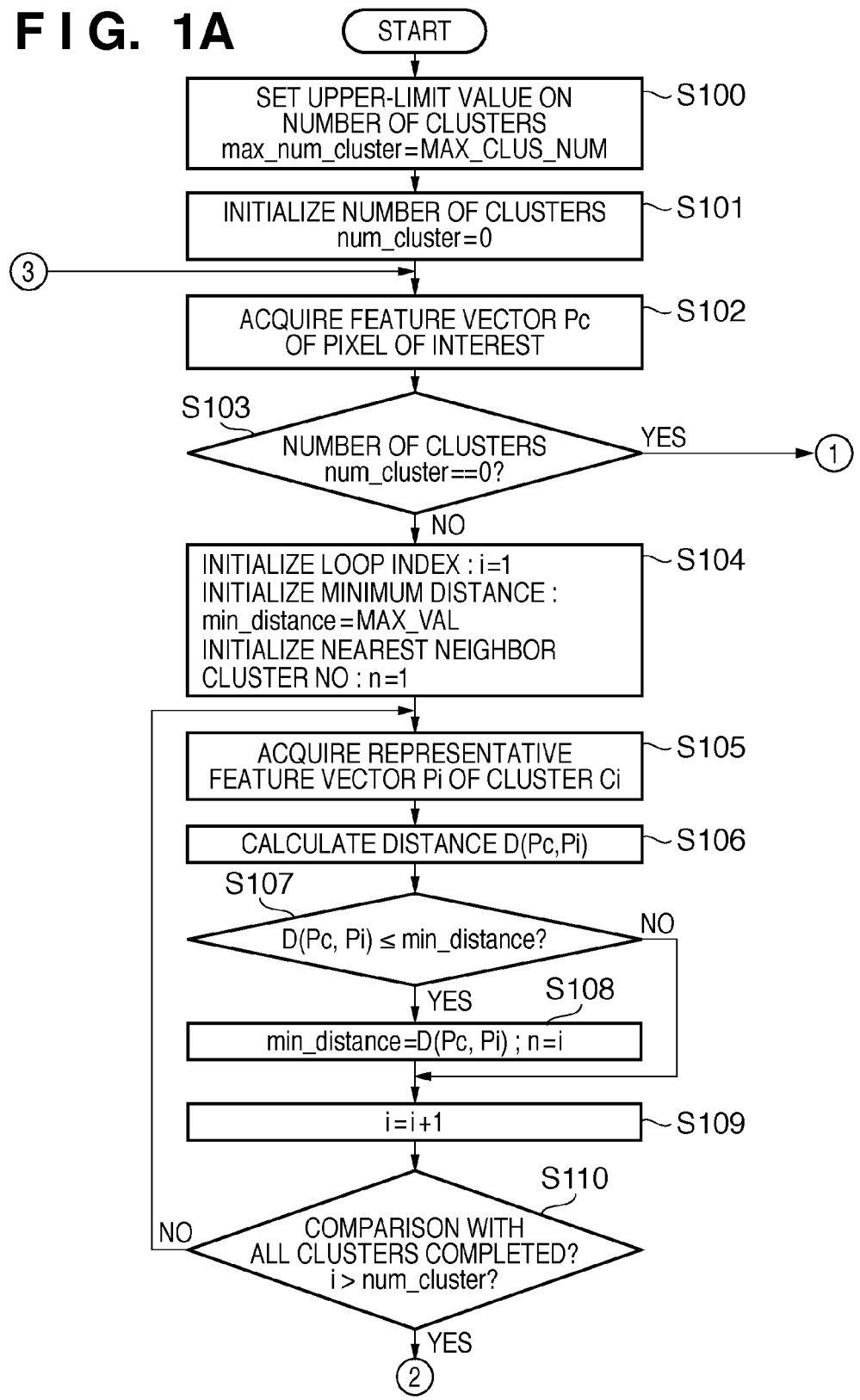

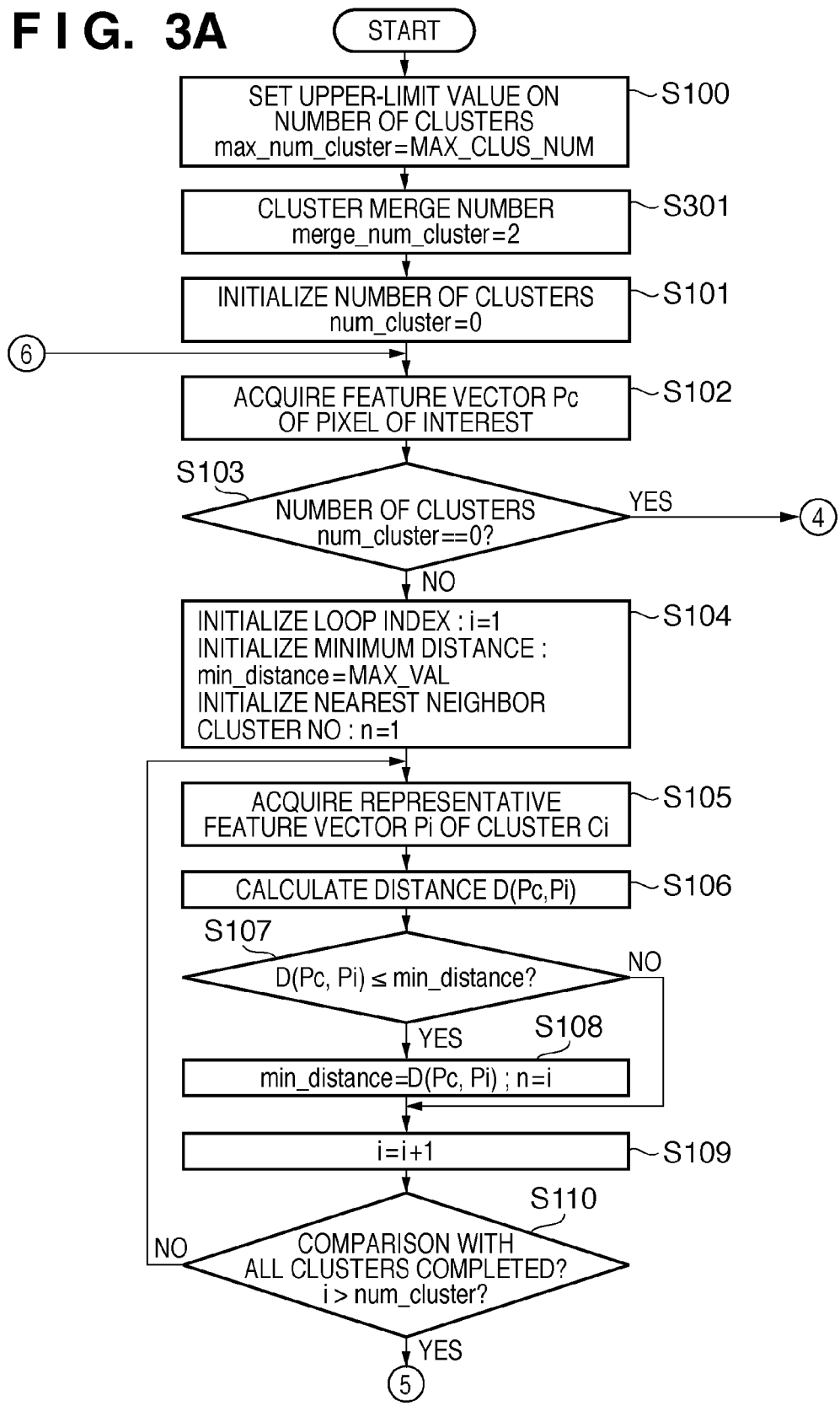

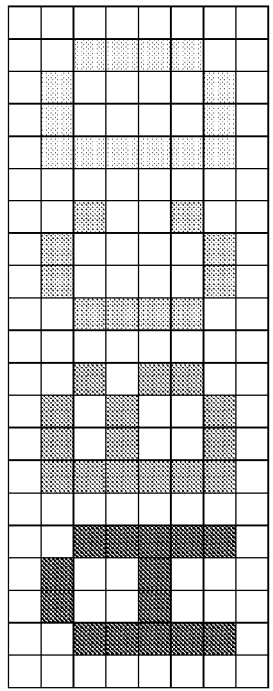

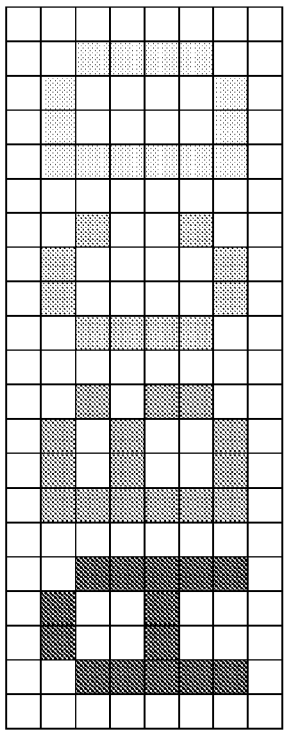

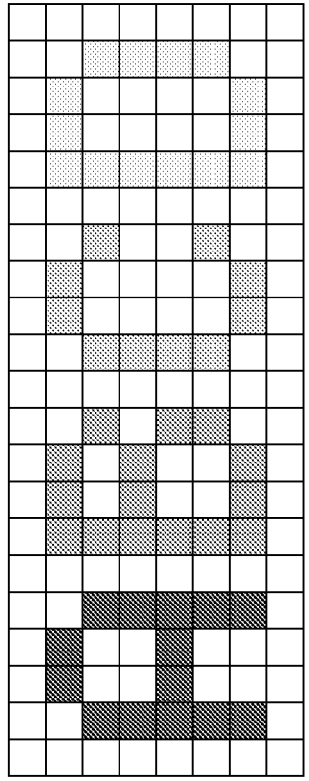
F I G. 8A
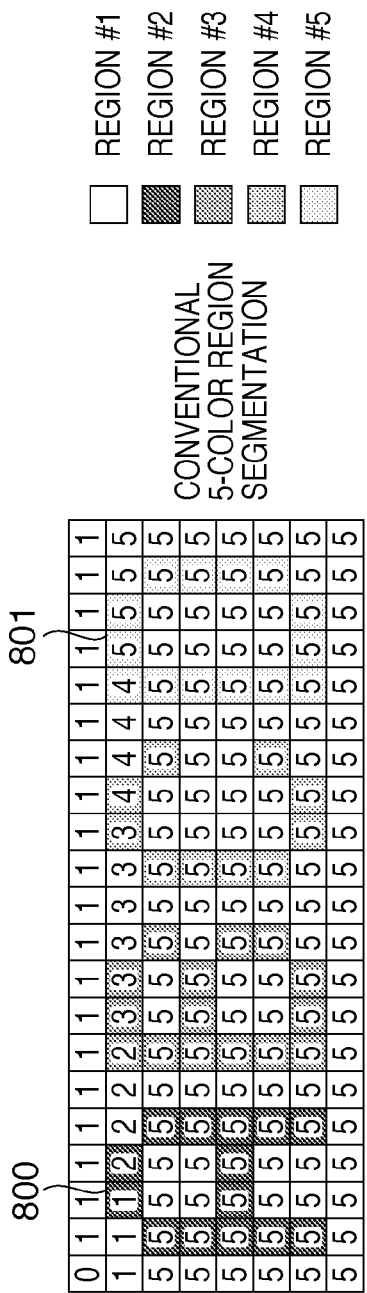
F I G. 8B

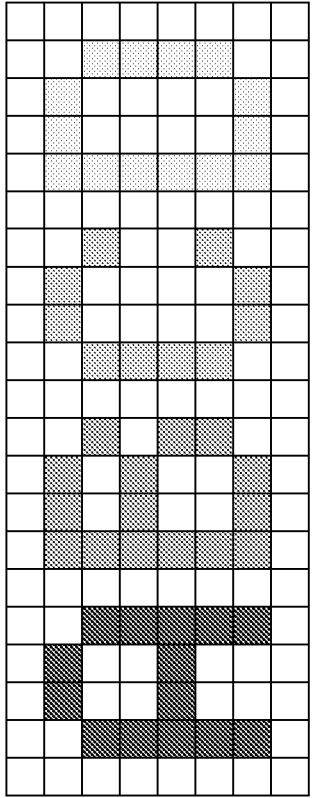

IMAGE PROCESSING METHOD, APPARATUS AND PROGRAM

BACKGROUND OF THE INVENTION

1. Field of the Invention

The present invention relates to an image processing method, apparatus and program for region segmentation of image data.

2. Description of the Related Art

The conversion of documents to electronic form goes beyond the mere acquisition of image data by reading a paper document using a scanner or the like. For example, image data is converted to an electronic form, it is separated into regions of different properties, such as the text, figures, photographs and tables that constitute a document. The process of converting the document to electronic form is used to execute processing that converts each region into data having the most suitable format. For example, a text region is converted to character code, a graphic region is converted to vector data, a background region or photographic region is converted to bitmap data, and a table region is converted to structure data.

For example, a conversion method using an image processing apparatus is disclosed in Japanese Patent Laid-Open No. 2007-158725 as a method of conversion to vector data. This image processing apparatus performs region segmentation by clustering processing, extracts the contour of each region and converts the extracted contour to vector data. Further, Japanese Patent Laid-Open No. 2008-206073 discloses an image processing method for separating an image into background and foreground, converts the foreground to vector data and subjects the background to data compression by a method exclusively for background. Further, Japanese Patent Laid-Open No. 2006-344069 discloses an image processing method for eliminating noise in a case where clustering processing has been applied to a document read by a scanner.

A method such as the nearest neighbor clustering method is known as a method for region segmentation of image data by clustering processing. The nearest neighbor clustering method compares the distances between the feature vector of a pixel of interest and the representative feature vectors of clusters and finds the cluster having the feature vector for which the distance is shortest. If the shortest distance found is less than a prescribed threshold value, then the pixel of interest is made to belong to the cluster. Otherwise, a new cluster is defined and the pixel of interest is made to belong to this cluster. In general, color information (a pixel value comprising R, G, B, for example) is used as the feature vector. The centroid of a cluster generally is used as the representative feature vector of the cluster. That is, the representative feature vector of a cluster is the average value of feature vectors (color information) of each of the pixels made to belong to the cluster.

With the nearest neighbor clustering method, the distances to the representative feature vectors of all clusters must be calculated pixel by pixel owing to the procedure described above. Accordingly, Japanese Patent Laid-Open No. 11-288465, for example, discloses a color image processing apparatus with the aim of reducing the amount of calculation. The apparatus of Japanese Patent Laid-Open No. 11-288465 performs clustering based upon a pixel of interest and the feature vector (color information) of a neighboring pixel, then performs grouping of clusters based upon the color information and geometrical information of clusters. The geometrical information is information such as coordinate information representing the closeness of regions.

The technology described in Japanese Patent Laid-Open No. 11-288465 is such that if the distance between the pixel of interest and the feature vector of the neighboring pixel is great, a cluster is defined anew and the pixel of interest is made to belong to this new cluster. A large quantity of clusters, therefore, are defined. A problem which arises as a consequence is a large increase in processing time needed to group the clusters.

A further problem is that performance for achieving the required processing time of the system cannot be assured owing to the increase in grouping processing time. The required processing time of the system refers to a critical processing time for assuring a constant performance such as scanner processing performance, namely the time it takes for the scanner to process one picture.

SUMMARY OF THE INVENTION

The present invention has been devised in view of the prior art described above and provides an image processing method for speeding up clustering processing to thereby implement region segmentation processing that makes it possible to assure performance.

In order to achieve this, the present invention provides an image processing apparatus for executing clustering processing which classifies pixels of image data into clusters, comprising: a classifying processing unit configured to classify a pixel of interest into a cluster if this cluster has a representative feature quantity whose difference with respect to a feature quantity of the pixel of interest is less than a threshold value, and if such a cluster does not exist, generate a new cluster and classify the pixel of interest into this new cluster; and a merge processing unit configured to determine whether the number of clusters has reached a prescribed upper-limit value before or after generation of the new cluster in a case where the new cluster has been generated by the classifying processing unit, and merge at least two clusters in a case where the upper-limit value has been reached.

In accordance with the present invention, clusters are merged if the number of clusters exceeds a set upper-limit value. As a result, the number of times distances to clusters are compared per pixel can be reduced and so can calculation time. This makes it possible to prevent a situation in which processing time exceeds the required processing time of the system owing to an increase in time needed for region segmentation of an image.

Further features of the present invention will become apparent from the following description of exemplary embodiments with reference to the attached drawings.

BRIEF DESCRIPTION OF THE DRAWINGS

FIGS. 1A and 1B are flowcharts representing the details of processing of an image processing method according to a first embodiment of the present invention;

FIGS. 3A and 3B are flowcharts representing the details of processing of an image processing method according to a third embodiment of the present invention;

FIGS. 6A, 6B and 6C are diagrams exemplifying number of times distance calculation is performed in the image processing method according to the first embodiment;

FIGS. 7A, 7B and 7C are diagrams exemplifying number of times distance calculation is performed in the image processing method according to the second embodiment;

FIGS. 8A, 8B, 8C and 8D are diagrams exemplifying number of times distance calculation is performed in the image processing method according to the third embodiment; and FIGS. 9A, 9B, 9C and 9D are diagrams exemplifying number of times distance calculation is performed in the image processing method according to the third embodiment.

DESCRIPTION OF THE EMBODIMENTS

First Embodiment

Figure 5:
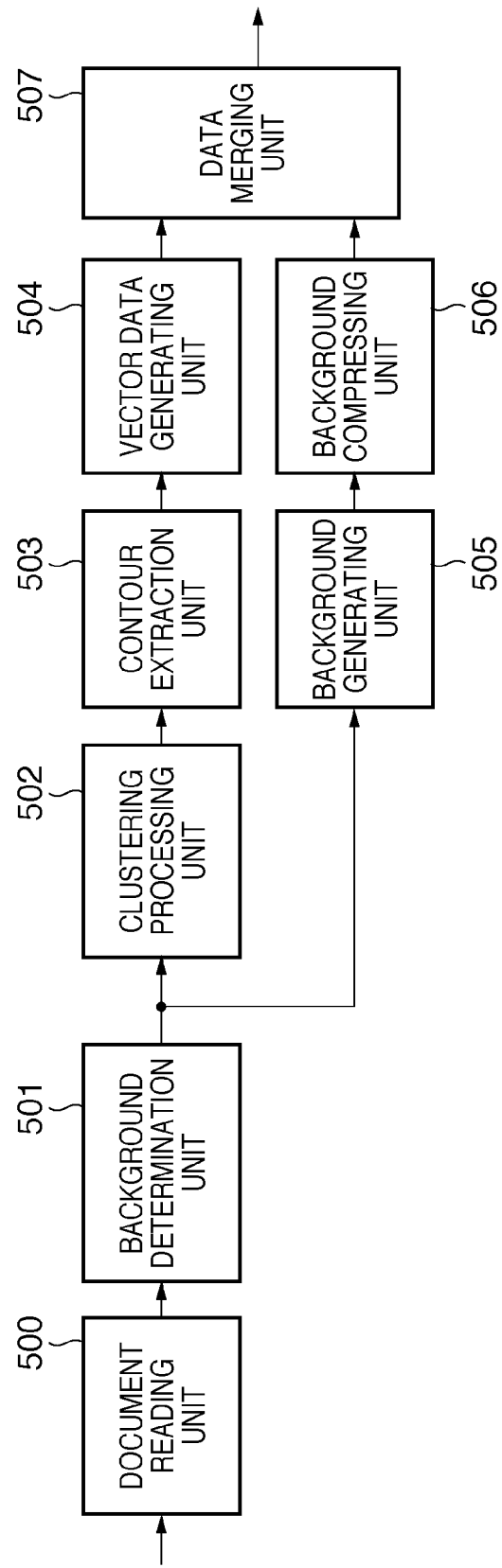
FIG. 5 is a block diagram illustrating the configuration of a vector data conversion apparatus.

Reference will be had to FIG. 5 to describe an image processing method according to a first embodiment of the present invention and the configuration of a vector data conversion apparatus that uses this method.

FIG. 5 is a block diagram illustrating the configuration of the vector data conversion apparatus. The apparatus includes a document reading unit 500 for reading a document. More specifically, the document reading unit 500 scans a document optically, converts the image of the document to an electrical signal using an image sensor, subjects the signal to an analog-to-digital conversion and outputs the result as image data. A background determination unit 501 determines whether each pixel of the image data that has been output from the document reading unit 500 is foreground or background and outputs, pixel by pixel, a background flag associated with the image data. The method of determining whether image data is background is the well-known method described in Japanese Patent Laid-Open No. 2008-206073. Further, in case of image data that has been read optically as by a scanner, for example, the background determination unit 501 discriminates the color of the paper and discriminates background pixels based upon the color of the paper.

A clustering processing unit 502 executes region segmentation of image data by applying the image processing method of this embodiment. The image data that has been output from the background determination unit 501 is input to the clustering processing unit 502 in raster-scan order one pixel at a time. The clustering processing unit 502 outputs the image data that is the result of region segmentation (clustering processing) (namely the image data of each cluster region). A contour extraction unit 503 extracts the contour of each region (each cluster) that has been segmented by the clustering processing unit 502. A vector data generating unit 504 generates vector data based upon the contour extracted by the contour extraction unit 503. The vector data generating unit 504 converts only foreground image data to vector data. On the basis of the background flag that has been output from the background determination unit 501, a background generating unit 505 fills in pixels other than background pixels in the image data with the background color and outputs the resultant data. A background compressing unit 506 compresses the data that has been output from the background generating unit 505. By way of example, the processing method which the background compressing unit 506 uses for compression is the JPEG encoding method, although the present invention is not limited to this method. A data merging unit 507 merges the vector data that has been output from the vector data generating unit 504 and the compressed data that has been output from the background compressing unit 506 and outputs a data file of image data.

It should be noted that the configuration of FIG. 5 has been put into block form in terms of function. The vector data conversion apparatus can be constructed by hardware blocks corresponding to the function blocks. Further, programs of the procedures shown in FIGS. 1A to 4 can be executed by a computer and the function blocks of FIG. 5 can be implemented logically or virtually by executing the programs. The computer can be a general-purpose computer having a CPU for processing image data by executing a program, a memory storing the program and storage for storing program files and image data files. Storage includes a hard disk or a portable storage medium.

<Clustering Processing>

Figure 1B:
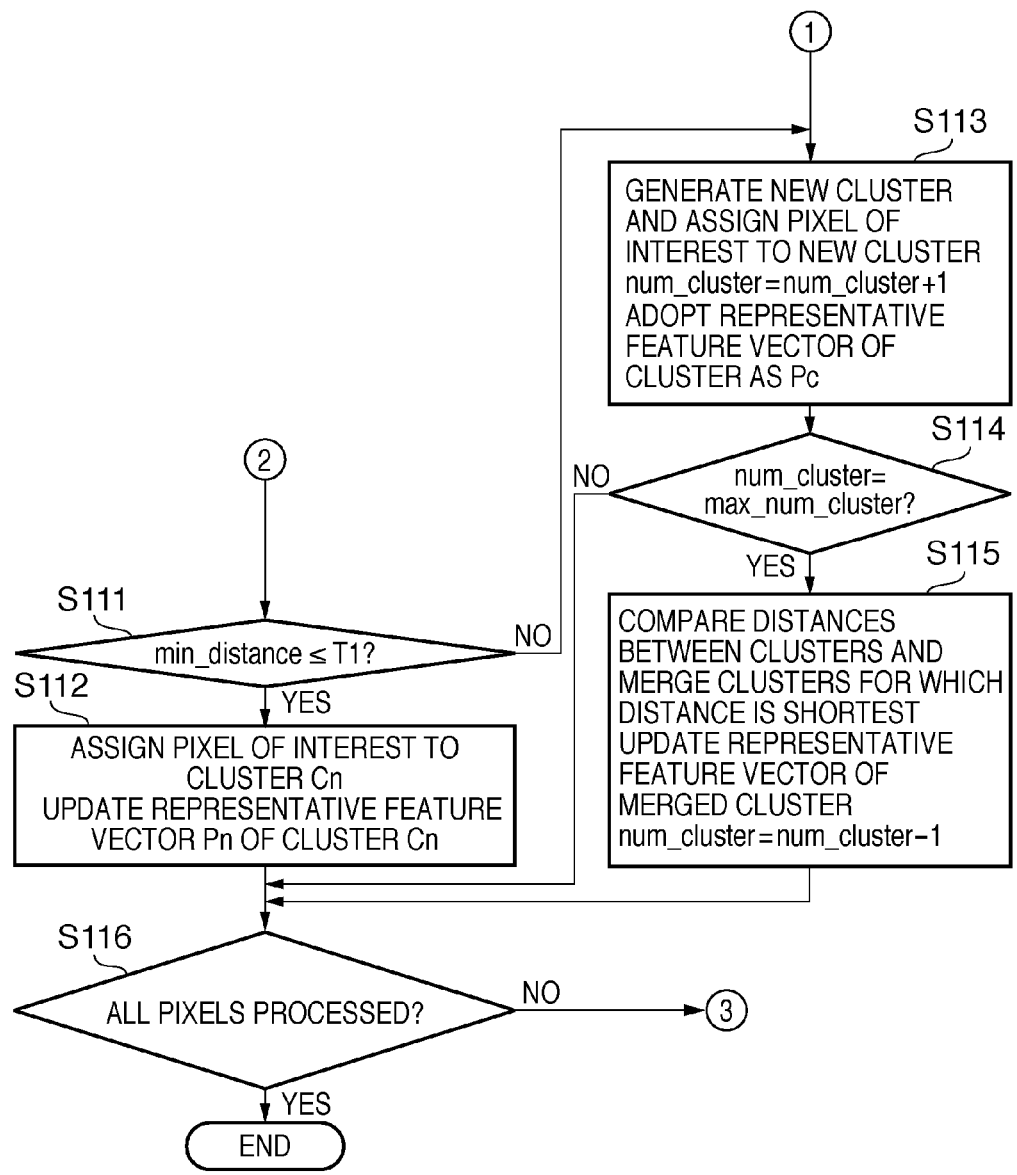

The processing executed by the clustering processing unit 502 will be described with reference to the flowcharts of FIGS. 1A and 1B. First, the clustering processing unit 502 sets a variable max_num_cluster representing an upper-limit value on number of clusters (step S100). Next, the clustering processing unit 502 initializes a variable num_cluster, which represents the present number of clusters, to zero (step S101). These processing steps are executed until the image data is input to the clustering processing unit 502. Accordingly, steps S100 and S101 may be executed in response to a trigger at the start of reading of the document image, by way of example.

Next, the clustering processing unit 502 acquires a feature vector Pc of pixel data (referred to as a "pixel of interest" below) to undergo clustering processing (step S102). Since the image data is input in raster-scan order, a pixel at the leading end of certain image data in the raster-scan order serves as the initial pixel of interest. It should be noted that the image processing method of this embodiment uses pixel values in RGB color space as the feature vector. However, this does not impose a limitation upon the invention. For example, pixel values in YCC color space may be used, and coordinate information of pixels may be used in addition to pixel values as feature vectors. Further, as long as a feature is represented, not only a vector but also a scalar quantity may be used. These shall be referred to as "feature quantities". A feature quantity representing a cluster shall be referred to as a "representative feature quantity". (In this embodiment, a feature vector is used as a feature quantity and therefore a feature vector representing each cluster is referred to as a "representative feature vector".) It should be noted that an average value of feature quantities of pixels made to belong to each cluster may be used as a method of calculating a representative feature quantity.

Next, the clustering processing unit 502 determines whether the number num_cluster of clusters is zero (step S103). If the number of clusters is zero ("YES" at step S103), processing proceeds to step S113. Otherwise ("NO" at step S103), processing proceeds to step S104.

The clustering processing unit 502 initializes a loop index i at step S104. The loop index i indicates the number of the cluster of interest. The cluster number is represented by an integer the smallest value of which is one. Further, a variable min_distance, which represents the minimum distance among distances between the feature vector Pc of the pixel of interest and representative feature vectors of each of the clusters, is initialized as a constant MAX_VAL. A value larger than the maximum distance that can be attained in the feature space (color space) is set as the constant MAX_VAL. Furthermore, a variable n, which represents the number of the cluster for which the distance to the feature vector Pc of the pixel of interest is shortest (namely the nearest neighbor cluster) is initialized to one. The nearest neighbor cluster is represented by Cn.

Next, the clustering processing unit 502 acquires a representative feature vector Pi of a cluster Ci (step S105). The representative feature vector Pi has been registered in table form, for example, in correlation with the number (identification information) i of the cluster. The clustering processing unit 502 calculates a distance D(Pc,Pi) between the feature vector Pc of the pixel of interest and the representative feature vector Pi of the cluster Ci (step S106) and compares this distance with the minimum distance min_distance (step S107). If the distance D(Pc,Pi) is equal to or less than the minimum distance min_distance ("YES" at step S107), then the clustering processing unit 502 substitutes the distance D(Pc,Pi) into the minimum distance min_distance and substitutes the loop index i into the nearest neighbor cluster number n (step S108). Processing then proceeds to step S109. If a "NO" decision is rendered at step S107, then processing proceeds directly to step S109.

At step S109, the clustering processing unit 502 increments the loop index i and, at step S110, determines whether the comparison between the feature vector Pc of the pixel of interest and the representative feature vectors of all clusters has been completed. If the loop index i is greater than the number num_cluster of clusters, then it can be determined that the comparison with all clusters has ended. If it is determined that the comparison with all clusters has ended ("YES" at step S110), processing proceeds to step S111. Otherwise ("NO" at step S110), processing proceeds to step S105. Attention is directed toward the next cluster from step S105 onward, the clustering processing unit 502 finds the distance D between the feature vector Pc of the pixel of interest and the representative feature vector Pi and repeats the above-described processing from step S106 onward.

The clustering processing unit 502 compares the minimum distance min_distance and a threshold value TH1 at step S111. If the minimum distance min_distance is equal to or less than the threshold value ("YES" at step S111), then the clustering processing unit 502 makes the pixel of interest belong to the nearest neighbor cluster Cn of the pixel of interest and updates a representative feature vector Pn of the nearest neighbor cluster Cn (step S112). For example, the clustering processing unit 502 calculates the centroid of feature vectors of pixels that belong to the cluster Cn, inclusive of the feature vector Pc of the pixel newly made to belong to this cluster. The centroid is the average of feature vectors (color information) of the pixels belonging to the cluster Cn. If the minimum distance min_distance is greater than the threshold value T1 ("NO" at step S111), then all clusters are remote from the feature vector of the pixel of interest. In principle, therefore, the pixel of interest is not made to belong to an existing cluster. Accordingly, processing proceeds to step S113. Making a pixel of interest belong to the nearest neighbor cluster Cn can be implemented by correlating and storing the pixel of interest and the identification information of the destination cluster. For example, a pixel can be made to belong to a cluster by providing an attribute map in which an attribute associated with every pixel has been registered and registering identification information (the cluster number, for example) of the nearest neighbor cluster as one attribute of the pixel of interest.

At step S113, the clustering processing unit 502 defines a new cluster and makes the pixel of interest belong to this cluster. It also adopts the representative feature vector of the newly generated cluster as the feature vector Pc of the pixel of interest. Furthermore, the clustering processing unit 502 increments the number num_cluster of clusters. The number of clusters obtained by adding on the newly added cluster is made the cluster number n of the cluster of interest. The reason for this is that the number of clusters obtained becomes the cluster number of the newly generated cluster.

At step S114, the clustering processing unit 502 determines whether the number num_cluster of clusters obtained by adding on the newly generated cluster has reached the upper-limit value of the number of clusters set at step S100. If the upper-limit value on number of clusters has not been reached ("NO" at step S114), processing proceeds to step S116. If the upper-limit value on number of clusters has been reached ("YES" at step S114), processing proceeds to step S115.

At step S115, the number of generated clusters has reached the upper-limit value and therefore the clustering processing unit 502 compares the representative feature vectors among the clusters existing at the present time and merges the nearest clusters. Further, the clustering processing unit 502 updates the representative feature vector of the merged cluster. Since the clusters have been merged, the clustering processing unit 502 decrements the number num_cluster of clusters. Further, the clustering processing unit 502 inserts the cluster number obtained after merging as the cluster number n of the cluster of interest. Processing then branches to step S116.

At step S116, the clustering processing unit 502 determines whether clustering processing has ended with regard to all pixels contained in the image data undergoing processing. For example, this is determined by a control code, which indicates the end of the data, appended to the tail end of the image data. Although the input to the clustering processing unit 502 is binary data, the clustering processing unit 502 can also make the above-mentioned determination using a control code if an algorithm that assures the transparency of the image data is being employed. If the determination made is that all pixels in the image data have been processed ("YES" at step S116), then processing by the clustering processing unit 502 is terminated. Otherwise ("NO" at step S116), processing proceeds to step S102 and the succeeding pixel is adopted as the new target of processing.

Several examples of processing for merging clusters at step S115 are conceivable. In a case where one of the clusters to be merged is a cluster that has been generated anew at step S113, the other of the clusters to be merged is essentially a cluster to which the pixel of interest will belong. In this case, nothing in particular need be done. This is a point in common with regard to each of the examples. If a cluster to be merged is not a new cluster, then, by way of example, a representative feature vector Pj, which has been registered in correlation with one cluster Cj to be merged, is replaced by a set consisting of a prescribed code indicating that the cluster has been merged and the number (identification information) k of the other cluster to be merged. In this case, the cluster number of the cluster obtained by merging is made k. Further, in this case, the fact that a certain cluster has been merged with another cluster first becomes clear by reading the representative feature vector from the table in which it has been registered. Accordingly, if, when the representative feature vector is acquired at step S105, the acquired value indicates that merging has taken place, then this cluster is skipped, attention is re-directed to the next cluster (that is, the index i is incremented) and processing is resumed from step S105. In a case where merge processing has been executed in this manner, the fact that a certain cluster has been merged with another cluster can be determined merely by the cluster identification information that has been associated with the pixel. In a case where reference is had to the result of clustering processing, therefore, reference is had to the table in which the feature vector of every pixel has been registered and processing is executed with the merged clusters serving as a single cluster. Alternatively, after clustering processing has ended with regard to all of the image data, processing for uniting clusters for which merging has been indicated may be executed again.

Another example is as follows: In a case where a cluster to be merged is not a new cluster, processing for substantially merging the cluster can be executed at step S115. For example, from among cluster numbers that have been registered in an attribute map in which an attribute has been associated with every pixel, the cluster numbers of clusters to be merged are replaced by the cluster numbers of the other clusters to be merged. The cluster numbers of the latter become the cluster numbers that result after the replacement. Cluster numbers that become unallocated as a result are reduced by subtracting larger cluster numbers one at a time. Preferably, the cluster numbers left by merging clusters will have smaller numbers than the others. The reason is that the amount of processing for reducing the numbers is reduced. A method of leaving unallocated numbers intact also is available in order to eliminate the processing for reducing cluster numbers. In this case, however, it is necessary to record information that clarifies the fact that a number is an unallocated number. The number num_cluster of clusters need not be decremented at step S115. Thus, clusters can be merged by various methods. In any case, replacing the cluster number prevailing before merging with the cluster number obtained after merging is the principal nature of merging.

Thus, image data is subjected to clustering processing, a cluster to which a pixel belongs is decided for every pixel and clusters are stored in correlation with the pixels. Each cluster represents the result of region segmentation of the image. By referring to the destination cluster to which every pixel is assigned, counter extraction processing is executed followed by vector generation processing.

Thus, as described above, the image processing method of this embodiment sets, in advance, an upper-limit value on the number of clusters generated (step S100). Control is exercised in such a manner that the number of clusters generated during clustering processing will not exceed the upper-limit value on the number of clusters (step S114). As a result, the number of times distances between clusters are compared per pixel is limited to the upper-limit value max_num_cluster at most. Accordingly, the number of times distance between the feature vector of the pixel of interest and the feature vectors of each of the clusters are calculated (this will be referred to as the "distance calculation" below) can be reduced in comparison with the conventional nearest neighbor clustering method. This will be described using images exemplified in FIGS. 6A to 6C.

In a case where an image comprising 8 pixels vertically and 21 pixels horizontally shown in FIG. 6A is subjected to region segmentation by clustering, the image is segmented into five regions unless an upper-limit value on the number of clusters is set. FIG. 6B illustrates the number of times distance calculation is performed per pixel in the nearest neighbor clustering method according to the prior art. FIG. 6C illustrates the number of times distance calculation is performed per pixel in a case where an upper-limit value on number of clusters has been set to four at step S100 of FIG. 1A in this embodiment. With the nearest neighbor clustering method according to the prior art, the number of distance calculations per pixel is one up to a pixel 600. Whenever a new color appears, however, the number of distance calculations increases and five distance calculations are required per pixel from a pixel 601 onward. In FIG. 6B, the number of distance calculations required for the entirety of the image data is 715.

On the other hand, with the image processing method of this embodiment, as shown in FIG. 6C, clusters corresponding to regions #4 and #5 for which the distance between the representative feature vectors is shortest are merged at the moment the number of clusters attains the upper-limit value at pixel 601. Since region #5 is a region newly generated, the pixels constituting the character "D" are classified into region #4 in terms of processing. As a result, an increase in number of clusters is suppressed and therefore the number of distance calculations per pixel is reduced in comparison with the prior art. In this case, the number of distance calculations from pixel 601 onward is reduced by one for every pixel in comparison with the prior art. In FIG. 6C, therefore, the number of distance calculations required for the entirety of the image data is 585.

<Setting of Upper-Limit Value>

A method of setting an upper-limit value that satisfies the required processing time of the system will be described. Also illustrated below is an example of system specification requirements of the vector data conversion apparatus shown in FIG. 5. It should be noted that the method is not limited to this embodiment and is applicable to other embodiments as well.

(1) Operating frequency of document reading unit: 200 MHz
(2) Number of cycles per time for distance calculation: 5 cycles
[Number of executable distance calculations in unit time (1 sec): 200M/5 cycles=40M times]
(3) Number of vectorization-target pixels (number of effective pixels based upon background determination unit): 76800
(4) Required processing time (processing time per image): 1 sec The operating frequency (1) is a numerical value of the processing capability of the document reading unit 500 in FIG. 5. In this embodiment, the operating frequency of the document reading unit is 200 MHz and the number of cycles (2) it takes for distance calculation per time is five cycles. The number of vectorization-target pixels (3) indicates the number of pixels determined to be foreground extracted in the background determination unit 501 of FIG. 5 and delivered to the clustering processing unit 502. In this embodiment, it is assumed that an image having an image size of 320×240 pixels, namely 76800 pixels, has been determined as foreground and delivered to the clustering processing unit 502 by the background determination unit 501. The required processing time (4) indicates processing time per image processed by the document reading unit 500 of FIG. 5. In this embodiment, the required processing time indicates that the clustering processing unit 502 is required to complete execution of processing in one second per image.

A method of calculating the upper-limit value on number of clusters in order to assure performance in line with the above-mentioned system specifications (that is, in order to complete clustering processing within the required processing time) will be described below. The following assumes a worst-case scenario in which a new cluster is generated for every pixel and clusters the number of which has been set to the upper-limit value are compared with every pixel.

Let C_lim represent the upper-limit value on number of clusters. In a case where a new cluster is generated every time until the upper-limit value on the number of clusters is reached, all clusters are compared pixel by pixel and therefore the number of distance calculations can be expressed by Equation [1] below. It should be noted that the upper-limit value C_lim is a value set to the upper-limit value max_num_cluster at step S100 in FIG. 1A.

$$C\_lim * (C\_lim - 1)/2 \qquad [1]$$

Next, in a case where distances from all pixels to all clusters are compared and clusters are merged after the number of clusters has reached the upper-limit value, a comparison of the distances of all clusters occurs and therefore distance calculations occur C_lim times per pixel. Since this is carried out for each of the remaining pixels, the number of distance calculations can be expressed by Equation [2] below.

$$C\_lim*(76800-C\_lim) \quad [2]$$

Furthermore, since cluster merging is performed after the cluster comparison of Equation [2], the number of distance calculations for this purpose can be expressed by Equation [3] below.

$$C\_lim*(C\_lim-1)/2*(76800-C\_lim) \quad [3]$$

Accordingly, in a case where an image comprising 76800 pixels in this embodiment is subjected to clustering processing, the predicted maximum value of the total number of times distance calculation is performed can be expressed by Equation [4] below, which is obtained by adding Equations [1], [2] and [3].

$$C\_lim*(C\_lim-1)/2+C\_lim*(76800-C\_lim)+C\_lim* \\ (C\_lim-1)/2*(76800-C\_lim) \quad [4]$$

In a case where the required processing time (4) is 1 sec, the operating frequency (1) of the document reading unit in this embodiment is 200 MHz and the number of distance calculations executable in one second, therefore, is 40,000,000.

Accordingly, in order to assure the required processing time (4) of the system specifications, it is necessary to set the upper-limit value C_lim of the number of clusters so as to satisfy Equation [5] below.

$$C\_lim*(C\_lim-1)/2+C\_lim*(76800-C\_lim)+C\_lim* \\ (C\_lim-1)/2*(76800-C\_lim)<40,000,000 \quad [5]$$

The maximum value of C_lim that satisfies Equation [5] is 31 (number of distance calculations: 38,077,889). If C_lim is set to 31, therefore, then the performance of the system specifications of this embodiment will always be assured. Accordingly, in the example set forth above, 31 should be set as the upper-limit value max_num_cluster at step S100.

Thus, the image processing method of this embodiment makes it possible to perform region segmentation at a speed higher than that of the conventional nearest neighbor clustering method. The image processing method of this embodiment, based upon the processing capability of the document reading unit 500 and the number of pixels to be processed found in the background determination unit 501, calculates an upper-limit value on number of clusters for implementing clustering processing that satisfies the required processing time (4). The number of distance calculations is suppressed by setting the above-mentioned upper-limit value. By virtue of the present invention, it is possible to set the upper-limit value on number of clusters so as to assure the performance of the clustering processing.

Second Embodiment

An image processing method according to a second embodiment of the present invention and the configuration of a vector data conversion apparatus that uses this method will be described. The configuration of the vector data conversion apparatus according to this embodiment is the same as that described in the first embodiment (FIG. 5) and processing also is the same with the exception of the processing executed by the clustering processing unit 502. The clustering processing unit 502 performs region segmentation of an image by applying the image processing method of this embodiment.

Figure 2:
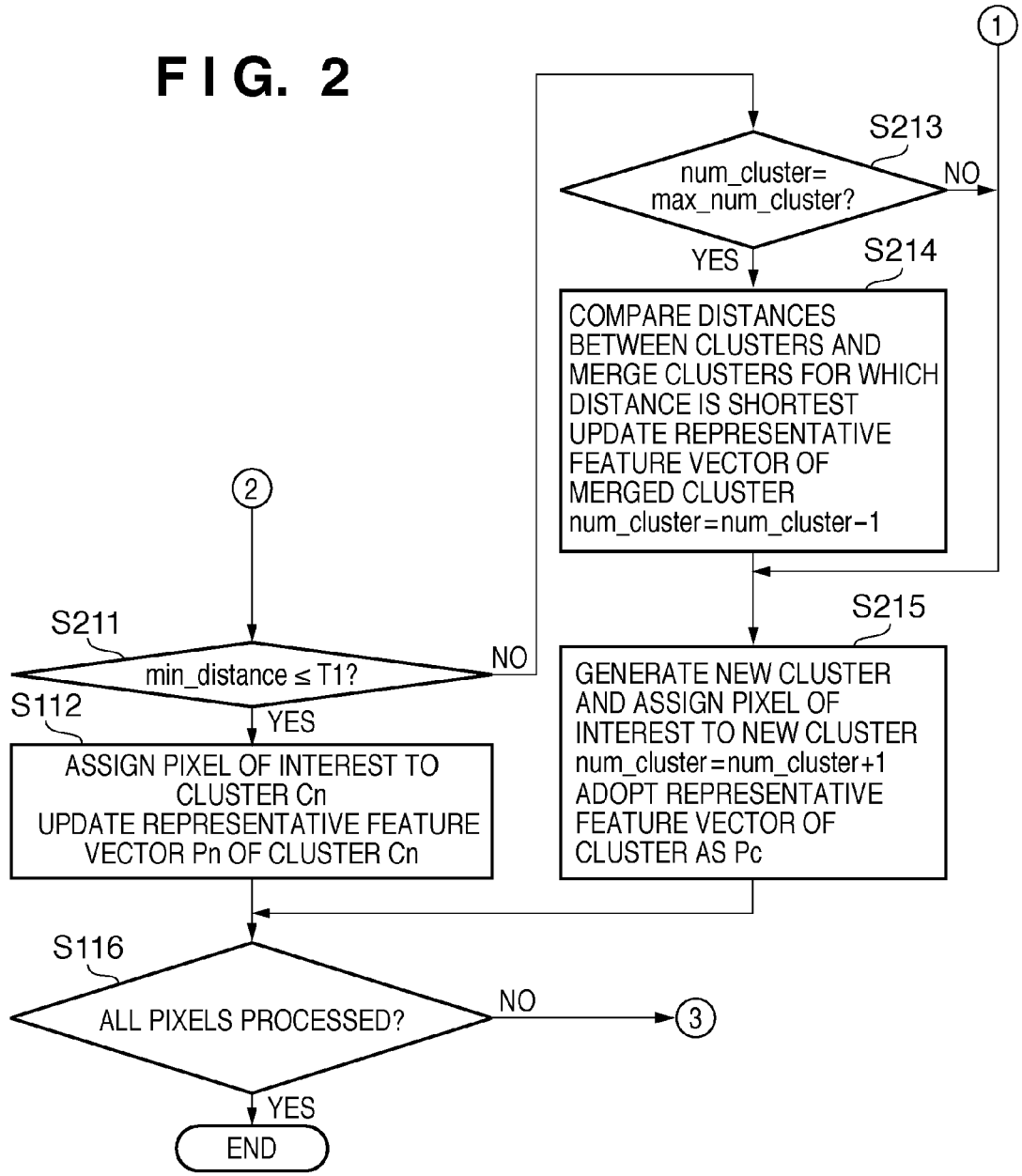
FIG. 2 is a flowchart representing the details of processing of an image processing method according to a second embodiment of the present invention.

The operation of the clustering processing unit 502 of this embodiment will be described below in detail with reference to the flowchart of FIG. 2. It should be noted that FIG. 2 is a flowchart that replaces FIG. 1B of the first embodiment. FIGS. 1A and 2 are flowcharts illustrating the processing according to this embodiment. Steps the processing content of which is identical with that of the steps in FIG. 1A or 1B are designated by like step numbers and need not be described again in detail. FIGS. 1B and 2 differ in that step S111 and steps S113 to S115 in FIG. 1B are replaced by step S211 and steps S213 to S215. This difference resides in the fact that in the first embodiment, two clusters for which the distance between representative feature vectors is shortest are merged after a new cluster is generated, whereas in this embodiment, a new cluster is generated after two clusters for which the distance between representative feature vectors is shortest are merged.

At step S211, the clustering processing unit 502 compares the minimum distance min_distance between clusters and threshold value T1, and processing proceeds to step S213 in a case where the minimum distance min_distance between clusters is greater than T1.

At step S213, the clustering processing unit 502 determines whether the number num_cluster of clusters has reached the upper-limit value max_num_cluster on number of clusters set at step S100. If the upper-limit value has not been reached ("NO" at step S213), then processing proceeds to step S215. If the upper-limit value has been reached ("YES" at step S213), then processing proceeds to step S214.

At step S214, the number of generated clusters has reached the upper-limit value and therefore the clustering processing unit 502 compares the representative feature vectors among the clusters generated and merges the nearest clusters. The clustering processing unit 502 updates the representative feature vector of the merged cluster. Since the clusters have been merged, the clustering processing unit 502 decrements the number num_cluster of clusters. It should be noted that the content of cluster merge processing at step S214 is similar to that of step S115.

At step S215, the clustering processing unit 502 defines a new cluster and makes the pixel of interest belong to this cluster. It also adopts the representative feature vector of the new cluster as the feature vector Pc of the pixel of interest. Furthermore, the clustering processing unit 502 increments the number num_cluster of clusters. Processing then branches to step S116.

If all pixels in the image data have been processed ("YES" at step S116), then processing by the clustering processing unit 502 is terminated. Otherwise ("NO" at step S116), processing proceeds to step S102 and the succeeding pixel is adopted as the new target of processing.

Thus, as described above, the image processing method of this embodiment sets, in advance, an upper-limit value on the number of clusters generated (step S100). Control is exercised in such a manner that the number of clusters generated during clustering processing will not exceed the upper-limit value on the number of clusters (step S213). As a result, the number of times distances to clusters are calculated per pixel is limited. Accordingly, the number of times distance between the feature vector of the pixel of interest and the feature vectors of each of the clusters is calculated can be reduced in comparison with the conventional nearest neighbor clustering method. This will be described using images exemplified in FIGS. 7A to 7C.

In a case where an image comprising 8 pixels vertically and 21 pixels horizontally shown in FIG. 7A is subjected to region segmentation by clustering, the image is segmented into five regions unless an upper-limit value on the number of clusters is set. FIG. 7B illustrates the number of times distance calculation is performed per pixel in the nearest neighbor clustering method according to the prior art. FIG. 7C illustrates the number of times distance calculation is performed per pixel in a case where an upper-limit value on number of clusters has been set to four at step S100 of FIG. 2 in this embodiment. With the nearest neighbor clustering method according to the prior art, the number of distance calculations per pixel is one up to a pixel 700. Whenever a new color appears, however, the number of distance calculations increases and five distance calculations are required per pixel from a pixel 701 onward. In FIG. 7B, the number of distance calculations required for the entirety of the image data is 715.

On the other hand, with the image processing method of this embodiment, as shown in FIG. 7C, clusters corresponding to regions #2 and #3 for which the distance between the representative feature vectors is shortest are merged at the moment the number of clusters attains the upper-limit value at pixel 701. As a result, an increase in number of clusters is suppressed and therefore the number of distance calculations per pixel is reduced in comparison with the prior art. In this case, the number of distance calculations from pixel 701 onward is reduced by one for every pixel in comparison with the prior art. In FIG. 7C, therefore, the number of distance calculations required for the entirety of the image data is 585.

Thus, the image processing method of this embodiment makes it possible to perform region segmentation at a speed higher than that of the conventional nearest neighbor clustering method.

Third Embodiment

Figure 3B:
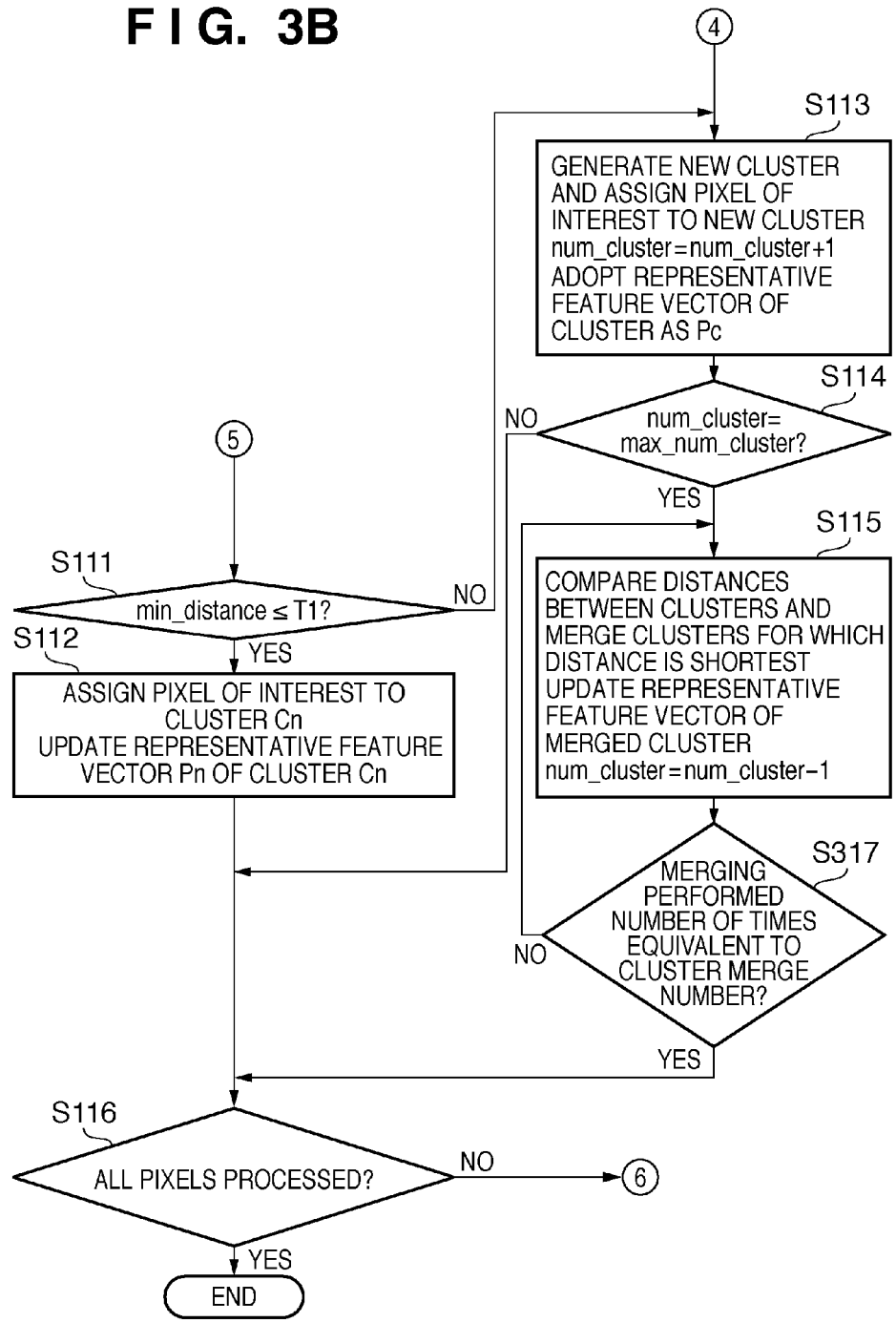

An image processing method according to a third embodiment of the present invention and the configuration of a vector data conversion apparatus that uses this method will be described. The configuration of the vector data conversion apparatus according to this embodiment is the same as that described in the first embodiment (FIG. 5) and processing also is the same with the exception of the processing executed by the clustering processing unit 502. The clustering processing unit 502 performs region segmentation of an image by applying the image processing method of this embodiment. The operation of the clustering processing unit 502 of this embodiment will be described below in detail with reference to the flowcharts of FIGS. 3A and 3B. It should be noted that steps the processing content of which is identical with that of the steps in FIG. 1A or 1B are designated by like step numbers and need not be described again in detail. FIG. 3A differs from FIG. 1A in that a step S301 has been added to the processing of FIG. 3A. FIG. 3B differs from FIG. 1B in that a step S317 has been added to the processing of FIG. 3B. This difference resides in the fact that in the first embodiment, two clusters for which the distance between representative feature vectors is shortest are merged after a new cluster is generated, whereas in this embodiment, a designated number of clusters are merged.

At step S301, the clustering processing unit 502 sets a cluster merge number merge_num_cluster indicating how many times merging of clusters is to be performed when the number of clusters has reached the upper-limit value. In the example of FIG. 3A, two has been set as the cluster merge number. However, the number may just as well be set to three or higher. Until execution of step S317 immediately following step S115, processing similar to that of FIGS. 1A and 1B is executed.

When two clusters are merged at step S115, step S317 is executed. At step S317, in relation to cluster merge processing when the number of clusters reaches the upper-limit value, the clustering processing unit 502 determines whether cluster merge processing for the number indicated by the cluster merge number merge_num_cluster set at step S301 has been executed. If cluster merging in the equivalent of the cluster merge number has been executed ("YES" at step S317), processing proceeds to step S116. If cluster merging in the equivalent of the cluster merge number has not been executed ("NO" at step S317), processing proceeds to step S115 in order to perform cluster merging again. An example of a way to achieve this is to count the number of executions at step S115 and render a "YES" decision at step S317 if the number of executions is equal to the cluster merge number set at step S301.

If all pixels in the image data have been processed ("YES" at step S116), then processing by the clustering processing unit 502 is terminated. Otherwise ("NO" at step S116), processing proceeds to step S102 and the succeeding pixel is adopted as the new target of processing.

Thus, as described above, the image processing method of this embodiment sets, in advance, an upper-limit value on the number of clusters generated (step S100). Control is exercised in such a manner that the number of clusters generated during clustering processing will not exceed the upper-limit value on the number of clusters (step S114). Furthermore, the cluster merge number is set (step S301). Control is exercised in such a manner that cluster merging carried out when the number of clusters has reached the upper-limit value is repeated a number of times equivalent to the cluster merge number (step S317). As a result, the number of times distances between clusters are compared per pixel is limited. Accordingly, the number of times distance between the feature vector of the pixel of interest and the feature vectors of each of the clusters is calculated can be reduced in comparison with the conventional nearest neighbor clustering method. This will be described using images exemplified in FIGS. 8A to 8D.

Figure 8C:
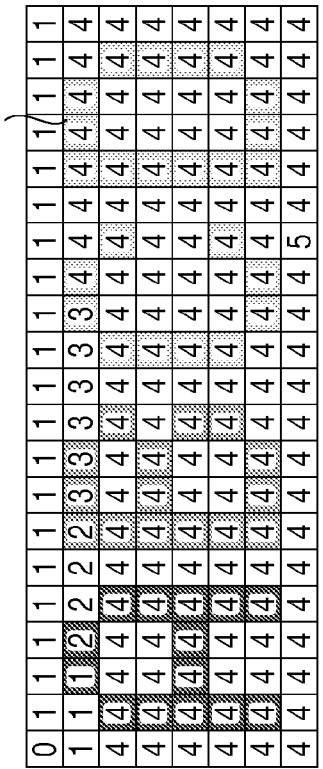
Figure 8D:
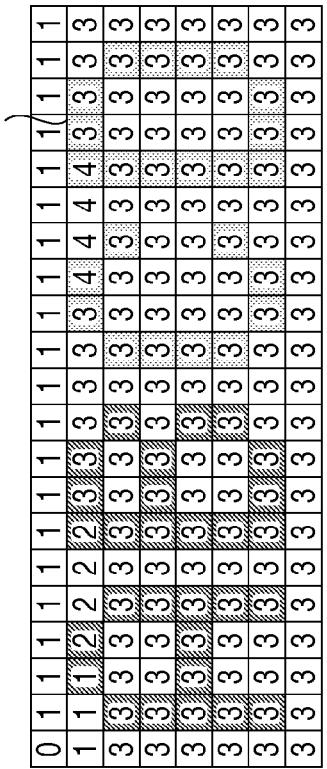

In a case where an image comprising 8 pixels vertically and 21 pixels horizontally shown in FIG. 8A is subjected to region segmentation by clustering, the image is segmented into five regions unless an upper-limit value on the number of clusters is set. FIG. 8B illustrates the number of times distance calculation is performed per pixel in the nearest neighbor clustering method according to the prior art. FIG. 8C illustrates the number of times distance calculation is performed per pixel in a case where an upper-limit value on number of clusters has been set to four at step S100 of FIG. 3A and the cluster merge number has been set to one at step S301 of FIG. 3A in this embodiment. FIG. 8D illustrates the number of times distance calculation is performed per pixel in a case where an upper-limit value on number of clusters has been set to four at step S100 of FIG. 3A and the cluster merge number has been set to two at step S301 of FIG. 3A in this embodiment.

With the nearest neighbor clustering method according to the prior art, the number of distance calculations per pixel is one up to a pixel 800. Whenever a new color appears, however, the number of distance calculations increases and five distance calculations are required per pixel from a pixel 801 onward. In FIG. 8B, the number of distance calculations required for the entirety of the image data is 715.

On the other hand, with the image processing method of this embodiment, as shown in FIG. 8C, clusters corresponding to regions #4 and #5 are merged at the moment the number of clusters attains the upper-limit value at pixel 801. As a result, an increase in number of clusters is suppressed and therefore the number of distance calculations per pixel is reduced in comparison with the prior art. In this case, the number of distance calculations from pixel 801 onward is reduced by one for every pixel in comparison with the prior art. In FIG. 8C, therefore, the number of distance calculations required for the entirety of the image data is 585. Furthermore, as shown in FIG. 8D, if the cluster merge number has been set to two, then, when the number of clusters reaches the upper-limit value at the pixel 801, first regions #4 and #5 are merged and then regions #2 and #3 are merged. As a result, the number of clusters is reduced to three. Since pixels from this point onward are all united with clusters already generated, the number of distance calculations is 455.

Thus, the image processing method of this embodiment makes it possible to perform region segmentation at a speed higher than that of the conventional nearest neighbor clustering method.

Fourth Embodiment

Figure 4:
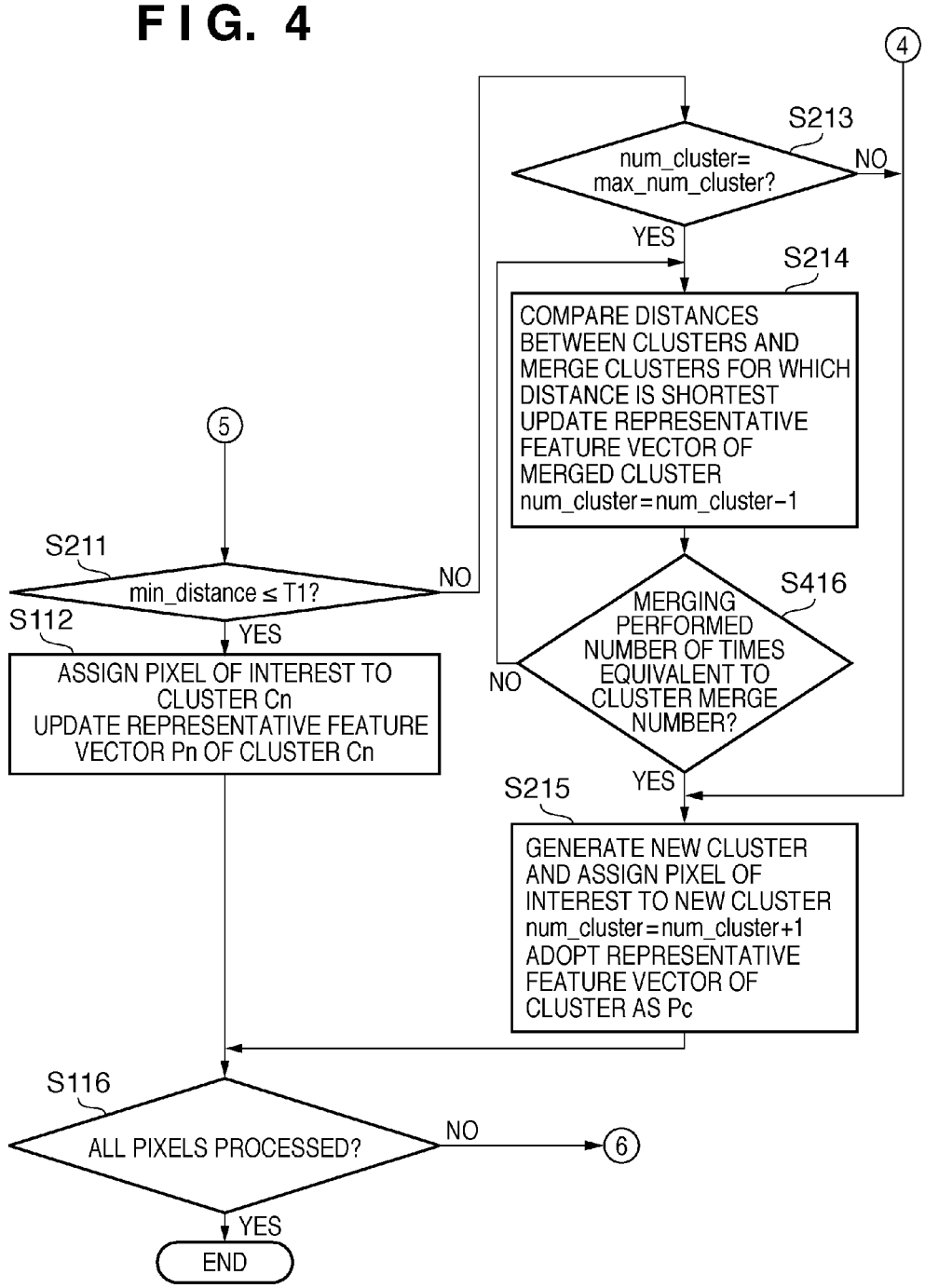
FIG. 4 is a flowchart representing the details of processing of an image processing method according to a fourth embodiment of the present invention.

An image processing method according to a fourth embodiment of the present invention and the configuration of a vector data conversion apparatus that uses this method will be described. The configuration of the vector data conversion apparatus according to this embodiment is the same as that described in the first embodiment (FIG. 5) and processing also is the same with the exception of the processing executed by the clustering processing unit 502. The clustering processing unit 502 performs region segmentation of an image by applying the image processing method of this embodiment. The operation of the clustering processing unit 502 of this embodiment will be described below in detail with reference to the flowchart of FIG. 4. This embodiment is obtained by blending the second and third embodiments. When merging of clusters is performed in the procedure of FIG. 2, merge processing is executed a number of times equivalent to the cluster merge number designated as illustrated in FIGS. 3A and 3B. FIG. 4 is a flowchart substituted for the flowchart of FIG. 3B of the third embodiment. FIGS. 3A and 4 are flowcharts illustrating processing according to this embodiment. Steps the processing content of which is identical with that of the steps in FIG. 2 are designated by like step numbers and need not be described again in detail. FIG. 4 differs in that a step S416 has been added to the processing of FIG. 2. This difference resides in the fact that in the second embodiment, a new cluster is generated after two clusters for which the distance between representative feature vectors is shortest are merged, whereas in this embodiment, a new cluster is generated after a designated number of clusters are merged.

The processing of FIG. 3A is executed from steps S100 to S110. From step S211 until execution of step S416 immediately following step S214, processing similar to that of FIG. 2 is executed.

When two clusters have been merged at step S214, the processing of step S416 is executed. At step S416, in relation to cluster merge processing when the number of clusters reaches the upper-limit value, the clustering processing unit 502 determines whether cluster merge processing for the number indicated by the cluster merge number merge_num_cluster set at step S301 has been executed. If cluster merging in the equivalent of the cluster merge number has been executed ("YES" at step S416), processing proceeds to step S215. If cluster merging in the equivalent of the cluster merge number has not been executed ("NO" at step S416), processing proceeds to step S214 in order to perform cluster merging again. An example of a way to achieve this is to count the number of executions at step S214 and render a "YES" decision at step S416 if the number of executions is equal to the cluster merge number set at step S301.

If all pixels in the image data have been processed ("YES" at step S116), then processing by the clustering processing unit 502 is terminated. Otherwise ("NO" at step S116), processing proceeds to step S102 and the succeeding pixel is adopted as the new target of processing.

Thus, as described above, the image processing method of this embodiment sets, in advance, an upper-limit value on the number of clusters generated (step S100). Control is exercised in such a manner that the number of clusters generated during clustering processing will not exceed the upper-limit value on the number of clusters (step S213). Furthermore, the cluster merge number is set (step S301). Control is exercised in such a manner that cluster merging carried out when the number of clusters has reached the upper-limit value is repeated a number of times equivalent to the cluster merge number (step S416). As a result, the number of times distances between clusters are compared per pixel is limited. Accordingly, the number of times distance between the feature vector of the pixel of interest and the feature vectors of each of the clusters is calculated can be reduced in comparison with the conventional nearest neighbor clustering method. This will be described using images exemplified in FIGS. 9A to 9D.

Figure 9C:
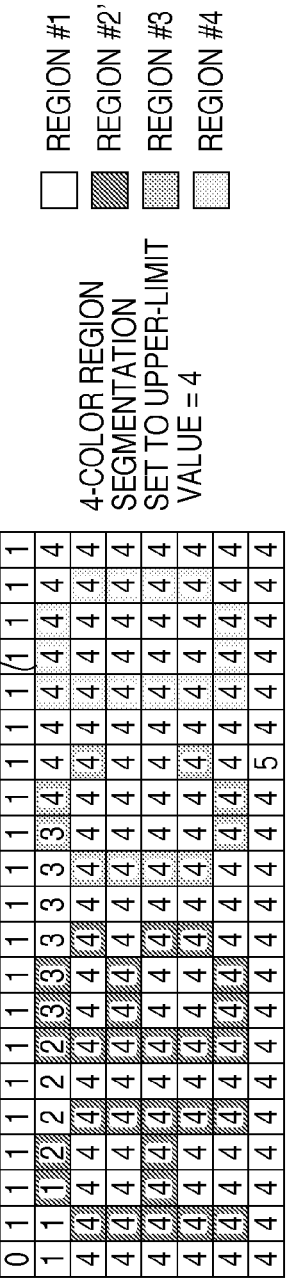
Figure 9D:
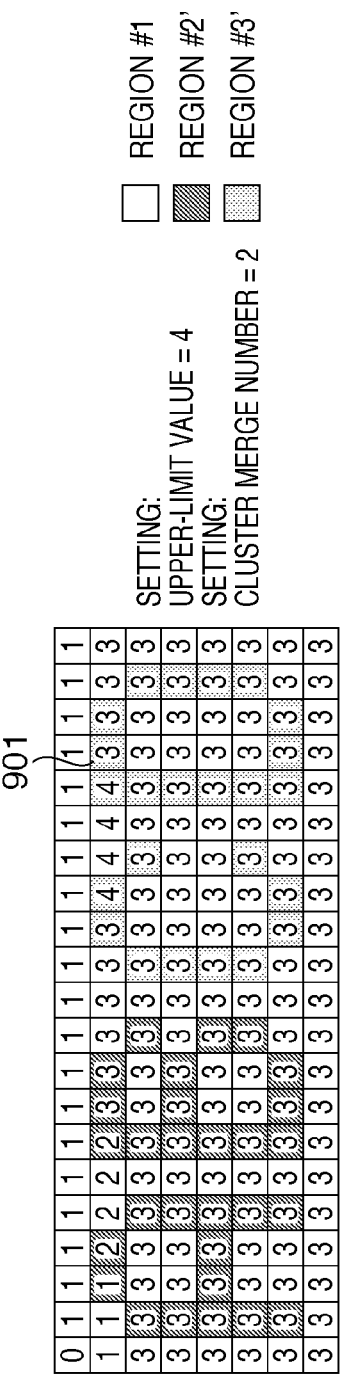

In a case where an image comprising 8 pixels vertically and 21 pixels horizontally shown in FIG. 9A is subjected to region segmentation by clustering, the image is segmented into five regions unless an upper-limit value on the number of clusters is set. FIG. 9B illustrates the number of times distance calculation is performed per pixel in the nearest neighbor clustering method according to the prior art. FIG. 9C illustrates the number of times distance calculation is performed per pixel in a case where an upper-limit value on number of clusters has been set to four at step S100 of FIG. 3A and the cluster merge number has been set to one at step S301 of FIG. 3A in this embodiment. FIG. 9D illustrates the number of times distance calculation is performed per pixel in a case where an upper-limit value on number of clusters has been set to four at step S100 of FIG. 3A and the cluster merge number has been set to two at step S301 of FIG. 3A in this embodiment.

With the nearest neighbor clustering method according to the prior art, the number of distance calculations per pixel is one up to a pixel 900. Whenever a new color appears, however, the number of distance calculations increases and five distance calculations are required per pixel from a pixel 901 onward. In FIG. 9B, the number of distance calculations required for the entirety of the image data is 715.

On the other hand, with the image processing method of this embodiment, as shown in FIG. 9C, clusters corresponding to regions #2 and #3 are merged at the moment the number of clusters attains the upper-limit value at pixel 901. As a result, an increase in number of clusters is suppressed and therefore the number of distance calculations per pixel is reduced in comparison with the prior art. In this case, the number of distance calculations from pixel 901 onward is reduced by one for every pixel in comparison with the prior art. In FIG. 9C, therefore, the number of distance calculations required for the entirety of the image data is 585. Furthermore, as shown in FIG. 9D, if the cluster merge number has been set to two, then, when the number of clusters reaches the upper-limit value at the pixel 901, first regions #2 and #3 are merged and then regions #4 and #5 are merged. As a result, the number of clusters is reduced to three. Since pixels from this point onward are all united with clusters already generated, the number of distance calculations is 455.

Thus, the image processing method of this embodiment makes it possible to perform region segmentation at a speed higher than that of the conventional nearest neighbor clustering method.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-172566, filed Jul. 23, 2009, which is hereby incorporated by reference herein in its entirety.

What is claimed is:

1. An image processing apparatus for executing clustering processing which classifies pixels of image data into clusters, comprising:
    a classifying processing unit configured to classify a pixel of interest into a cluster if this cluster has a representative feature quantity whose difference with respect to a feature quantity of the pixel of interest is less than a threshold value, and if such a cluster does not exist, generate a new cluster and classify the pixel of interest into this new cluster; and
    a merge processing unit configured to determine whether the number of clusters has reached a prescribed upper-limit value before or after generation of the new cluster in a case where the new cluster has been generated by said classifying processing unit, and merge at least two clusters in a case where the upper-limit value has been reached.

2. The apparatus according to claim 1, wherein said merge processing unit merges clusters a previously designated number of times in a case where the number of clusters has reached the prescribed threshold value.

3. The apparatus according to claim 1, wherein said merge processing unit merges two clusters for which the difference between representative feature quantities is minimum.

4. The apparatus according to claim 1, wherein the feature quantity is a vector representing color of a pixel;
    the representative feature quantity is an average of feature quantities of pixels that belong to the cluster; and
    said classifying processing unit performs classification with the distance between vectors serving as the difference between feature quantities.

5. The apparatus according to claim 1, wherein the representative feature quantity is an average of feature quantities of pixels that belong to the cluster; and
    when clusters are merged, said merge processing unit adopts an average of feature quantities of pixels, which belong to the cluster obtained after such merging, as the feature quantity of the cluster obtained after such merging.

6. The apparatus according to claim 1, further comprising an extraction processing unit configured to extract a contour of every cluster, into which image data has been classified by said classifying processing unit, from image data that has undergone the clustering processing.

7. An image processing method for classifying pixels of image data into clusters by an image processing apparatus having a determination processing unit, a classifying processing unit and a merge processing unit, the method comprising:
    a determination step of said determination processing unit determining whether a cluster having a representative feature quantity whose difference with respect to a feature quantity of the pixel of interest is less than a threshold value exists;
    a classifying step of said classifying processing unit classifying the pixel of interest into a cluster whose difference with respect to the feature quantity of the pixel of interest is less than a threshold value if it is determined that this cluster exists, and generating a new cluster and classifying the pixel of interest into this new cluster if it is determined that a cluster whose difference with respect to the feature quantity of the pixel of interest is less than a threshold value does not exist; and
    a step of said merge processing unit determining whether the number of clusters has reached a prescribed upper-limit value before or after generation of the new cluster in a case where the new cluster has been generated at said classifying step, and merging at least two clusters in a case where the upper-limit value has been reached.

8. A non-transitory computer-readable recording medium storing a program for executing clustering processing which classifies pixels of image data into clusters, said program instructing a microprocessor to perform:
    a classifying processing step of classifying a pixel of interest into a cluster if this cluster has a representative feature quantity whose difference with respect to a feature quantity of the pixel of interest is less than a threshold value, and if such a cluster does not exist, generating a new cluster and classifying the pixel of interest into this new cluster; and
    a merge processing step of determining whether the number of clusters has reached a prescribed upper-limit value before or after generation of the new cluster in a case where the new cluster has been generated by said classifying processing unit, and merging at least two clusters in a case where the upper-limit value has been reached.

* * * * *